United States Patent [19]

Prapas

[11] 4,242,485
[45] Dec. 30, 1980

[54] UV LIGHT RESISTANT P-METHYLSTYRENE/METHYL METHACRYLATE COPOLYMER

[75] Inventor: Aristotle G. Prapas, Edison, N.J.

[73] Assignee: Mobil Oil Corporation, New York, N.Y.

[21] Appl. No.: 77,976

[22] Filed: Sep. 24, 1979

[51] Int. Cl.³ .................. C08F 212/12; C08F 220/14
[52] U.S. Cl. ................................................. 526/329.2
[58] Field of Search .......................... 526/329.2, 347.1

[56] References Cited

U.S. PATENT DOCUMENTS

| | | | |
|---|---|---|---|
| 3,427,275 | 2/1969 | Davis et al. | 526/329.2 |
| 4,137,389 | 1/1979 | Wingler et al. | 526/329.2 |

*Primary Examiner*—Harry Wong, Jr.
*Attorney, Agent, or Firm*—Charles A. Huggett; Hastings S. Trigg

[57] ABSTRACT

This invention provides UV light resistant polymers that comprise copolymers of p-methylstyrene and methyl methacrylate containing between about 20 weight percent and about 50 weight percent methyl methacrylate.

3 Claims, No Drawings

UV LIGHT RESISTANT P-METHYLSTYRENE/METHYL METHACRYLATE COPOLYMER

BACKGROUND OF THE INVENTION

1. Field of the Invention

This invention is concerned with copolymers of p-methylstyrene that are resistant to UV light.

2. Description of the Prior Art

It has been proposed to copolymerize styrene with methyl methacrylate. Poly (p-methylstyrene) is degraded by UV light at a faster rate than in polystyrene. Insofar as is now known, copolymers of p-methylstyrene and methyl methacrylate have not been proposed.

SUMMARY OF THE INVENTION

This invention provides UV light resistant polymers that comprise copolymers of p-methylstyrene and methyl methacrylate containing between about 20 weight percent and about 50 weight percent methyl methacrylate.

DESCRIPTION OF SPECIFIC EMBODIMENTS

One monomer used in preparing the copolymers of this invention is p-methylstyrene. It is within the contemplation of this invention to use mixtures of methylstyrene rich in p-methylstyrene. Such mixtures contain at least 95 weight percent, preferably 97-99 weight percent, p-methylstyrene and less than 0.1 weight percent o-methylstyrene with the balance being m-methylstyrene. A typical mixture contains, by weight, about 97 percent p-methylstyrene, about 3 percent m-methylstyrene, and about 0.05 percent o-methylstyrene. The mixtures are obtained by catalytic dehydrogenation of the mixtures of ethylmethyl benzene isomers described in U.S. Pat. No. 4,086,287, which is incorporated herein by reference.

The other monomer is methyl methacrylate, a well known and commercially available unsaturated ester. Generally, in terms of weight percent, the copolymer will contain between about 80% and about 50% p-methylstyrene and between about 20% and about 50% methyl methacrylate.

Polymerization may be effected under bulk conditions or by solution, suspension or emulsion techniques comparable to those used for styrene polymerization. The polymerization catalysts may be of the free radical, anionic or cationic types. Suitable free radical initiators include di-tertiary butyl peroxide, azobis (isobutyronitrile), di-benzoyl peroxide, tertiary butyl perbenzoate, di-cumyl peroxide and potassium persulfate. Cationic initiators are generally of the Lewis acid type, for example, aluminum trichloride, boron trifluoride, boron trifluoride etherate complexes, titanium tetrachloride and the like. Anionic initiators are generally of the formula R(M)y where R is mono- or polyvalent hydrocarbyl and may be alkyl, alkenyl, aryl, aralkyl, or alkaryl, and may contain from 1 to about 50 carbon atoms; M is alkali metal; and y is 1 to 4, and preferably 1 or 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, and ethyl potassium can be used in this reaction. Also, metal initiators containing a dianion, such as the alkali metal salts of 1,1-diphenylethylene and alpha-methylstyrene tetramer and the radical anion initiators of the sodium naphthalene type may be used.

Stereospecific catalysts can also be used to advantage. Such catalysts are generally of the well known Ziegler-Natta type, comprising a transition metal of Group 4A, 5A, 6A or 7, in a valence state lower than its maximum in combination with an organometallic compound of Group 2 or 3.

As previously mentioned, the polymerization may be carried out in bulk, in solution, in suspension or in emulsion. Solution polymerization will generally employ inert hydrocarbon solvents, such as toluene, benzene or ethyl toluene. Suspension polymerization is generally carried out in an aqueous medium comprising water and suspending agents such as calcium phosphates, polyvinyl alcohol, hydroxyethyl cellulose, or sodium polyacrylates. Suitable suspension polymerization techniques will be comparable to those used with styrene monomer, which are well known in the art and described, for example, in U.S. Pat. No. 2,715,118. Emulsion techniques also will be comparable to those used for styrene, using an aqueous medium with the addition of suitable surfactants. Catalysts will normally be of the free-radical type, for example, a combination of butyl peroxide and tertiary butyl perbenzoate.

The polymerization conditions will generally be similar to those used for styrene. Thus temperatures will generally be in the range of 0° to 200° C., preferably 50° to 150° C., with a range of about −80° C. to +30° C. being most appropriate for cationic polymerization.

EXAMPLE 1

A mixture of 65.00 g. p-methylstyrene (97% para), 55.06 g. methyl methacrylate, and 0.1820 g. azobis (isobutyronitrile) in 50.68 g. toluene was heated in a nitrogen atmosphere at 60° C. for 96 hours, then at 90° C. for 24 hours. The polymer was moved from the reactor with the aid of additional toluene and precipitated in excess methanol in a blender. The polymer was dried in a vacuum oven at 105° C. and 26" vacuum for 22 hours, then at 115°-120° C. and 27" vacuum for 48 hours. The yield was 118.6 g. (98.8%). Plaques were pressed from the polymer and test specimens about 32 mils thick were cut from the plaques.

EXAMPLE 2

Using the procedure of Example 1, a copolymer of p-methylstyrene and methyl methacrylate containing 25 weight percent methyl methyacrylate was prepared.

EXAMPLE 3

For comparison purposes, a p-methylstyrene homopolymer was prepared using the procedure of Example 1.

Test specimens from Examples 1 through 3 were exposed in a Weather-O-Meter Model 600WR with a Xenon arc at 57° C. and 38% relative humidity. Periodically, test specimens were checked for color degradation on the Hunter Color Difference Meter. The results are set forth in the Table showing the Hunter b scale (blue-yellow). Degradation is manifested by an increase in the Yellow (+b) value.

TABLE

| Exposure, Hours | Example 1 | Example 2 | Example 3 |
|---|---|---|---|
| 0 | 0.6 | 0.7 | 1.1 |
| 89 | 1.6 | 1.3 | 3.1 |
| 283 | 2.4 | 2.9 | 5.1 |
| 433 | 3.5 | 4.6 | 7.8 |
| 537 | 4.1 | 5.4 | 8.7 |
| 662 | 6.4 | 9.6 | 19.8 |
| 755 | 7.8 | 12.9 | 26.8 |
| 802 | 9.4 | 17.0 | 29.8 |
| 1025 | 12.2 | 21.6 | 42.5 |
| 1185 | 19.6 | 23.2 | 45.5 |

From the data in the Table, it will be apparent that the copolymers of this invention have a high degree of resistance to degradation by UV light. Such copolymers are useful in packaging, such as bottles that are subject to exposure to sunlight.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. UV light resistant solid, linear copolymers of p-methylstyrene or a methylstyrene mixture containing at least about 95 weight percent p-methylstyrene and less than 0.1 weight percent o-methylstyrene with the balance being m-methylstyrene and methyl methacrylate containing between about 20 weight percent and about 50 weight percent methyl methacrylate.

2. The copolymer of claim 1, wherein the amount of methyl methacrylate is about 45 weight percent.

3. The copolymer of claim 1, wherein the amount of methyl methacrylate is about 25 weight percent.

* * * * *

UNITED STATES PATENT AND TRADEMARK OFFICE
CERTIFICATE OF CORRECTION

PATENT NO. : 4,242,485
DATED : December 30, 1980
INVENTOR(S) : Aristotle G. Prapas It is certified that error appears in the above-identified patent and that said Letters Patent are hereby corrected as shown below:

Column 1, line 13      "in" should read --is--

Signed and Sealed this

Twenty-eighth Day of April 1981

[SEAL]

Attest:

RENE D. TEGTMEYER

Attesting Officer                Acting Commissioner of Patents and Trademarks